(12) United States Patent
García Nieto et al.

(10) Patent No.: US 10,906,631 B2
(45) Date of Patent: Feb. 2, 2021

(54) LIFTING SURFACE

(71) Applicant: Airbus Operations S.L., Getafe (ES)

(72) Inventors: Carlos García Nieto, Getafe (ES); Iker Vélez De Mendizábal Alonso, Getafe (ES); Soledad Crespo Peña, Getafe (ES); Enrique Guinaldo Fernández, Getafe (ES); Jesús Javier Vázquez Castro, Getafe (ES); Álvaro Torres Salas, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 484 days.

(21) Appl. No.: 15/872,619

(22) Filed: Jan. 16, 2018

(65) Prior Publication Data

US 2018/0201360 A1 Jul. 19, 2018

(30) Foreign Application Priority Data

Jan. 17, 2017 (EP) .................................... 17382019

(51) Int. Cl.
*B64C 23/06* (2006.01)
*B64C 5/10* (2006.01)
(Continued)

(52) U.S. Cl.
CPC .................. *B64C 9/18* (2013.01); *B64C 5/02* (2013.01); *B64C 5/10* (2013.01); *B64C 23/06* (2013.01); *Y02T 50/10* (2013.01)

(58) Field of Classification Search
CPC .............. B64C 3/36; B64C 3/58; B64C 23/06
See application file for complete search history.

(56) References Cited

U.S. PATENT DOCUMENTS 4,039,161 A * 8/1977 Bauer .................... B64C 23/06
                                                                                          244/213
4,566,657 A * 1/1986 Grow ...................... B64C 9/20
                                                                                         244/90 A (Continued)

FOREIGN PATENT DOCUMENTS

| EP | 2543588 | 1/2013 |
|---|---|---|
| EP | 2801521 | 11/2014 |
| EP | 3053827 | 8/2016 |

OTHER PUBLICATIONS

European Search Report, dated Jul. 4, 2017, priority document.

*Primary Examiner* — Brian M O'Hara
(74) *Attorney, Agent, or Firm* — Greer, Burns & Crain, Ltd.

(57) ABSTRACT

A lifting surface comprising a movable discontinuity located in the surface of the lifting surface. The movable discontinuity is movable between an active position in which the movable discontinuity acts as vortex generator, and a passive position in which the movable discontinuity is integrated into the surface of the lifting surface without acting as vortex generator. The lifting surface may be in an elevator, the elevator being rotatable around a hinge line with respect to the rest of the lifting surface. A bar is rigidly joined to the elevator. The bar, the elevator and the movable discontinuity are configured such that when the elevator rotates with respect to the rest of the lifting surface, the bar moves the movable discontinuity that departs from the surface of the lifting surface, acting as a vortex generator.

15 Claims, 4 Drawing Sheets

(51) Int. Cl.
    *B64C 9/18*     (2006.01)
    *B64C 5/02*     (2006.01)

(56) References Cited

U.S. PATENT DOCUMENTS

| | | | | |
|---|---|---|---|---|
| 5,253,828 | A * | 10/1993 | Cox | B64C 23/06 |
| | | | | 244/200.1 |
| 6,105,904 | A * | 8/2000 | Lisy | B64C 3/58 |
| | | | | 244/130 |
| 8,167,554 | B2 * | 5/2012 | Wang | F03D 1/0608 |
| | | | | 244/204.1 |
| 10,370,085 | B2 * | 8/2019 | Dorsett | B64C 5/10 |
| 2013/0009016 | A1 | 1/2013 | Fox et al. | |
| 2014/0331665 | A1 | 11/2014 | Shivashankara et al. | |
| 2016/0229520 | A1 | 8/2016 | Tiryaki et al. | |

* cited by examiner

LIFTING SURFACE

CROSS-REFERENCES TO RELATED APPLICATIONS

This application claims the benefit of the European patent application No. 17382019.2 filed on Jan. 17, 2017, the entire disclosures of which are incorporated herein by way of reference.

FIELD OF THE INVENTION

The invention is related to a lifting surface having vortex generators in its surface.

BACKGROUND OF THE INVENTION

A vortex generator is an aerodynamic surface, consisting of a small vane or bump that creates a vortex. Vortex generators delay flow separation and aerodynamic stalling thus improving the effectiveness of lifting/control surfaces.

Vortex generators are positioned in such a way that they have an angle of attack with respect to the local airflow. A vortex generator creates a tip vortex which draws energetic, rapidly-moving air from outside the slow-moving boundary layer into contact with the aircraft skin. The boundary layer normally thickens as it moves along the aircraft surface, reducing the effectiveness of trailing-edge control surfaces. Vortex generators can be used to remedy this problem, among others, by re-energizing the boundary layer allowing the airfoil to operate at higher angles-of-attack without airflow separation.

In terms of aircraft operability, the main benefits of using these devices apply to:
  Increment in maximum take-off weight.
  Increment in maximum landing weight.
  Aircraft noise reduction.
  Efficiency increment of aircraft control surfaces.

Although vortex generators are known and have been used for over many years, they continue being one of the most effective flow control devices. Nevertheless, it is also known that if they are fixed for improving performance in one flight regimen, they use to penalize the performance in other operational conditions.

SUMMARY OF THE INVENTION

The lifting surface object of the invention comprises:
  a movable discontinuity located in the surface of the lifting surface, the movable discontinuity being movable between:
    an active position in which the movable discontinuity acts as vortex generator, and
    a passive position in which the movable discontinuity is integrated into the surface of the lifting surface without acting as vortex generator,
  an elevator, the elevator being rotatable around a hinge line with respect to the rest of the lifting surface,
  a bar rigidly joined to the elevator,
  the bar, the elevator and the movable discontinuity being configured such that when the elevator rotates with respect to the rest of the lifting surface, the bar moves the movable discontinuity that departs from the surface of the lifting surface acting as a vortex generator.

The movable discontinuities are preferably located at the torsion box trailing edge and more preferably they are located at the trailing edge panels. Therefore, vortex generators "appear" at the trailing edge panels depending on the flight regime.

BRIEF DESCRIPTION OF THE DRAWINGS

To complete the description and in order to provide for a better understanding of the invention, a set of drawings is provided. The drawings form an integral part of the description and illustrate preferred embodiments of the invention. The drawings comprise the following figures.

DETAILED DESCRIPTION OF THE PREFERRED EMBODIMENTS

Figure 1:
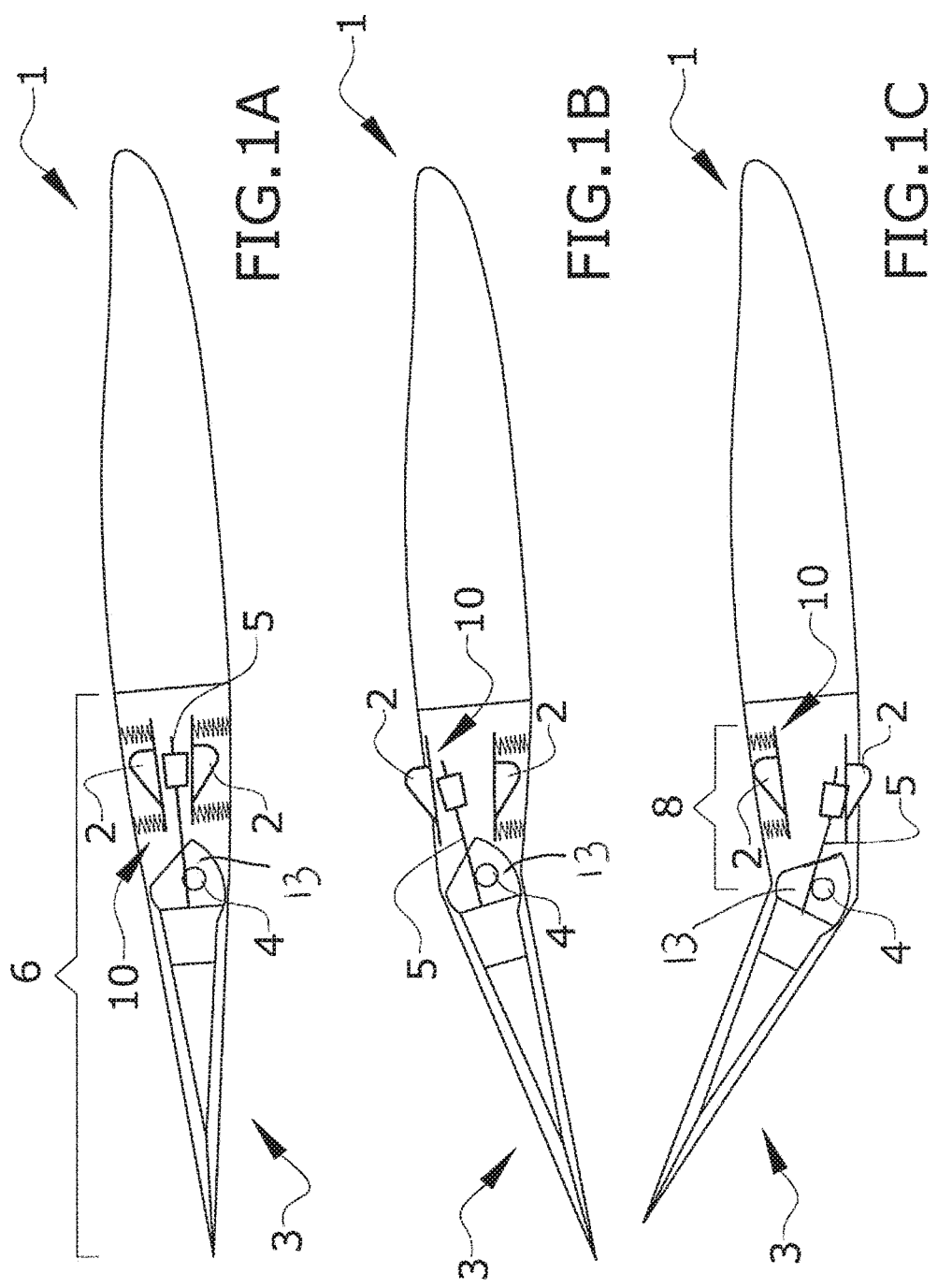
FIGS. 1A, 1B and 1C show a cross section of a first embodiment of a lifting surface having a trailing edge and an elevator in three different positions.
Figure 2:
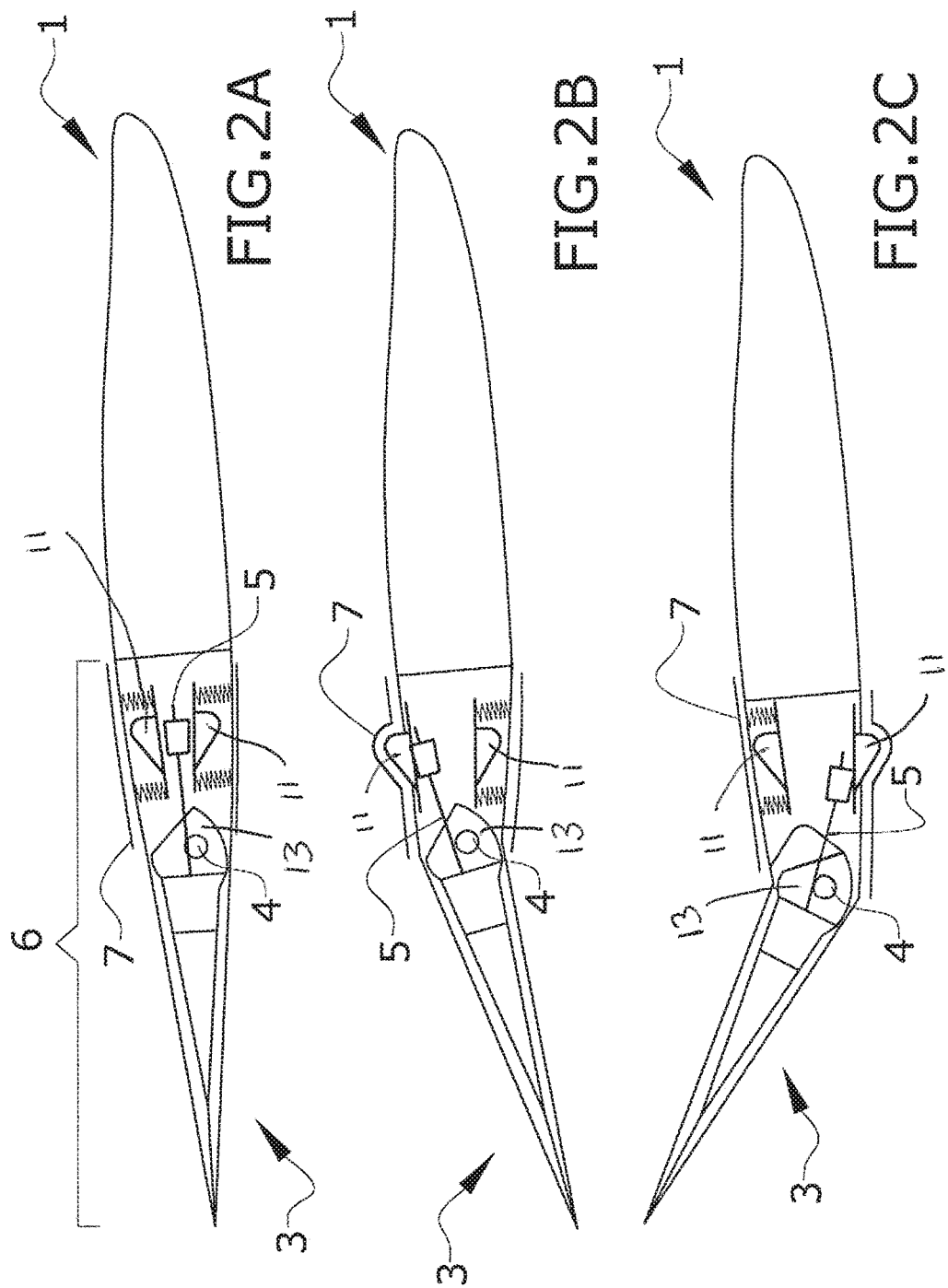
FIGS. 2A, 2B and 2C show a cross section of a second embodiment of a lifting surface having a trailing edge and an elevator in three different positions.

FIGS. 1 and 2 show two embodiments of the invention showing in FIGS. 1A, 1B and 1C a first embodiment in which some openings (10) are located on the trailing edge (6) in order to allow the movable discontinuities (2) to come out when the elevator (3) rotates around a hinge line (4). More specifically, the movable discontinuity (2) is located in the trailing edge panels (8) of the lifting surface (1). This first embodiment has the disadvantage of impacting aerodynamics due to the openings (10) at the trailing edge (6).

FIGS. 2A, 2B and 2C show a second embodiment in which a flexible skin (7) is included at the vortex generators affected area in order to mitigate the aerodynamic impact due to the openings (10).

Upper and lower trailing edge panels (8) are manufactured with flexible skins (7) of aramid, nylon, polyester or other fabrics, stiff enough to avoid unallowable deformations and flexible enough to change their position according with the inner kinematic of the vortex generators elements.

In this embodiment, the movable discontinuity (2) therefore comprises two different elements, an intermediate element (11) that is pushed by the bar (5) and the flexible skin (7) that is, in turn, pushed by the intermediate element (11).

Preferably, the element to which the bar (5) is attached is the front spar (13) of the elevator (3). The front spar (13) is sufficiently rigid and does not move relative to the other elements of the elevator (3), so that the movement of the bar (5) is made jointly with the movement of the elevator (3).

Figure 3:
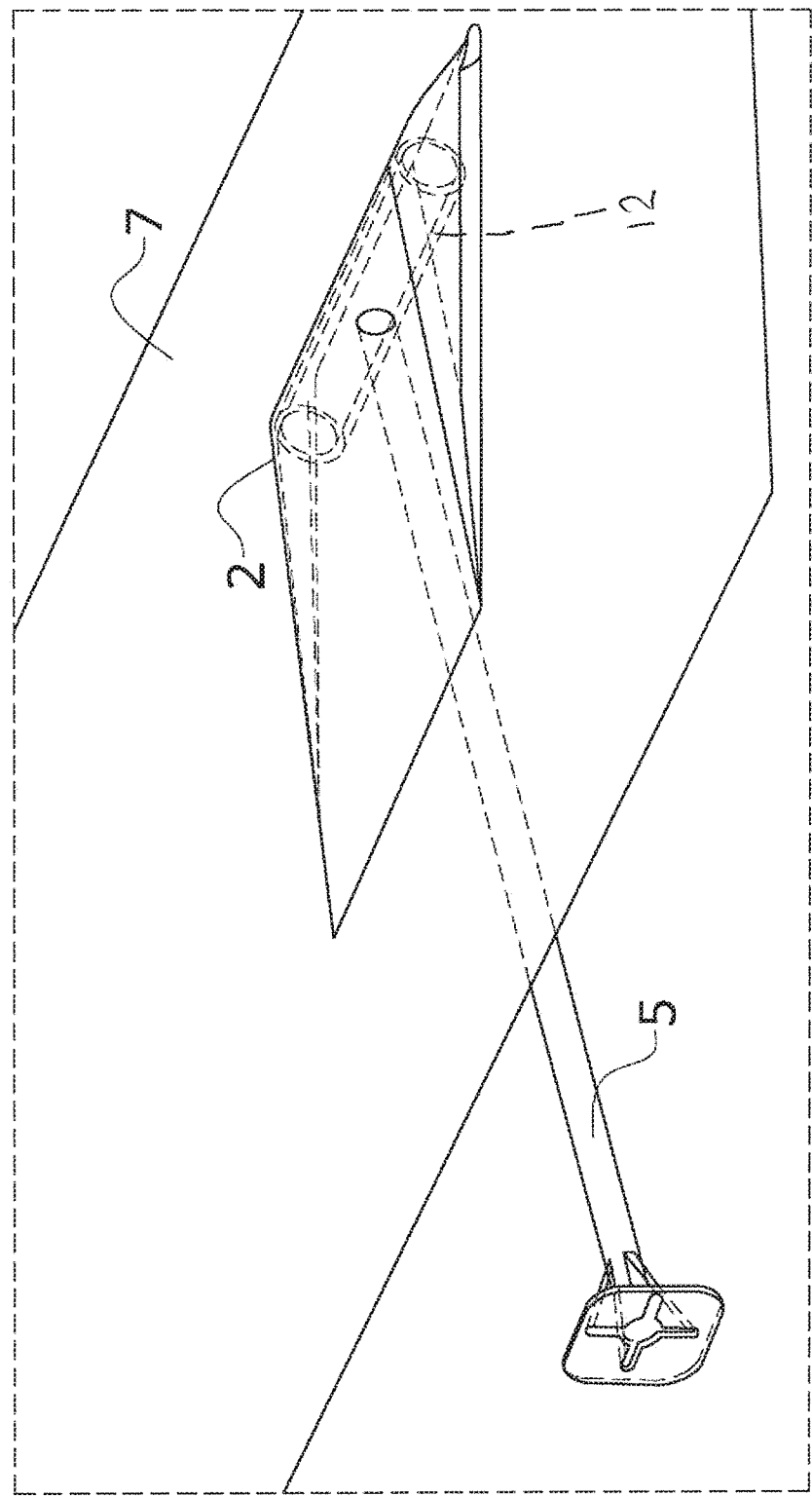
FIG. 3 shows a schematic perspective view of a third embodiment of the discontinuity being pressed by the bar.
Figure 4:
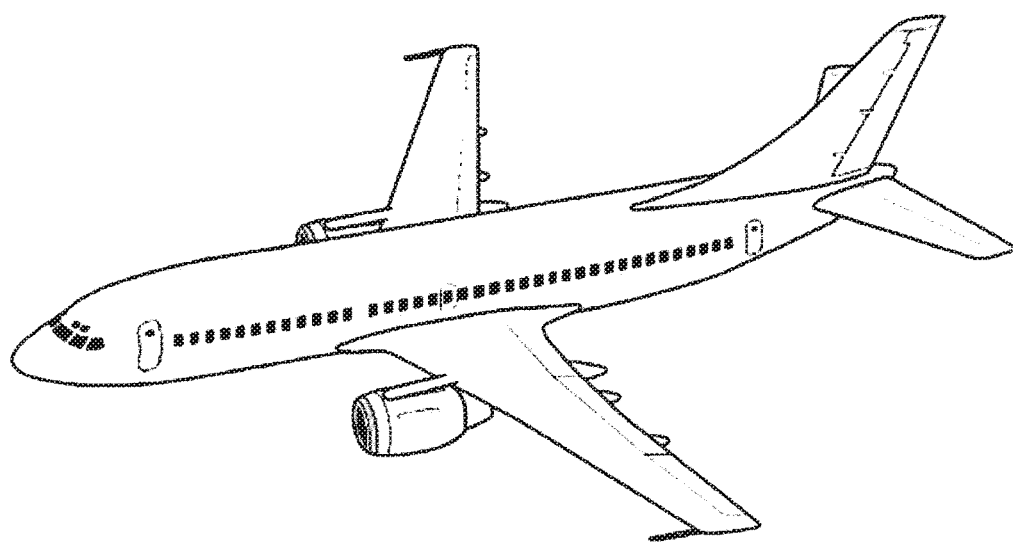
FIG. 4 shows a schematic perspective view of an aircraft having a lifting surface according to the invention.

FIG. 3 shows an additional embodiment comprising a flexible skin (7) but in this embodiment the end of the bar (5) is adapted to produce the deformation in the flexible skin (7) by having a corresponding shape. In the shown embodiment, the end of the bar (5) comprises a cylindrical element (12) having its longitudinal axis perpendicular to the axis of the bar (5).

Although all the three shown embodiments show that the bar (5) pushes the movable discontinuity (2) such that it comes out from the surface of the lifting surface (1) forming a protuberance another possibility exists wherein the bar (5) pull the movable discontinuity (2) such that it comes in from the surface of the lifting surface (1) forming a recess in the surface.

The movable discontinuity (2) would preferably be located in the surface of the lifting surface (1) more appropriate for the stability and control of the aircraft, for instance, in the face having a negative pressure gradient or what is the same, wherein the suction pressures are produced instead than in the positive pressures face of the lifting surface (1).

Note that vortex generators shapes can be different (rectangular, triangular, ogive, parabolic, gothic, inverse triangular, . . . ).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A lifting surface having upper and lower trailing edge panels and comprising:
    a movable discontinuity located in a surface of the lifting surface, the movable discontinuity being movable between:
        an active position in which the movable discontinuity acts as vortex generator, and
        a passive position in which the movable discontinuity is integrated into the surface of the lifting surface without acting as vortex generator,
    an elevator, the elevator being rotatable around a hinge line with respect to a remainder of the lifting surface, and
    a bar rigidly joined to the elevator to move in unison with all movements of the elevator,
    the upper and lower trailing edge panels having an outer surface formed of a flexible skin,
    wherein the movable discontinuity comprises the flexible skin, and
    wherein the movable discontinuity additionally comprises an intermediate element separate from and configured to be moved by the bar and wherein, in turn, the intermediate element is separate from and configured to move the flexible skin,
    the bar, the elevator and the movable discontinuity being configured such that when the elevator rotates with respect to the remainder of the lifting surface, the bar moves the movable discontinuity that departs from the surface of the lifting surface acting as a vortex generator.

2. The lifting surface according to claim 1, wherein the movable discontinuity is located in a trailing edge of the lifting surface.

3. The lifting surface according to claim 2, wherein the movable discontinuity is located in the trailing edge panels of the lifting surface.

4. The lifting surface according to claim 1, wherein the bar is joined to the front spar of the elevator.

5. The lifting surface according to claim 1, wherein the bar pushes the movable discontinuity such that the discontinuity comes out from the surface of the lifting surface forming a protuberance.

6. The lifting surface according to claim 1, wherein the bar pulls the movable discontinuity such that it comes in from the surface of the lifting surface forming a recess.

7. An aircraft comprising a lifting surface according to claim 1.

8. A lifting surface having upper and lower trailing edge panels and comprising:
    a movable discontinuity located in a surface of the lifting surface, the movable discontinuity being movable between:
        an active position in which the movable discontinuity acts as vortex generator, and
        a passive position in which the movable discontinuity is integrated into the surface of the lifting surface without acting as vortex generator,
    an elevator, the elevator being rotatable around a hinge line with respect to the rest of the lifting surface, and
    a bar rigidly joined to the elevator to move in unison with all movements of the elevator,
    the upper and lower trailing edge panels having an outer surface formed of a flexible skin,
    wherein the movable discontinuity comprises the flexible skin, and
    wherein a contiguous end of the bar comprises a shape, with a longitudinal axis extending perpendicular to an axis of the bar, according to a deformation to be produced on the flexible skin and is configured to engage and move the flexible skin,
    the bar, the elevator and the movable discontinuity being configured such that when the elevator rotates with respect to a remainder of the lifting surface, the bar moves the movable discontinuity that departs from the surface of the lifting surface acting as a vortex generator.

9. The lifting surface according to claim 8, wherein the movable discontinuity is located in a trailing edge of the lifting surface.

10. The lifting surface according to claim 9, wherein the movable discontinuity is located in the trailing edge panels of the lifting surface.

11. The lifting surface according to claim 8, wherein the end of the bar comprises a cylindrical element having a longitudinal axis perpendicular to an axis of the bar.

12. The lifting surface according to claim 8, wherein the bar is joined to the front spar of the elevator.

13. The lifting surface according to claim 8, wherein the bar pushes the movable discontinuity such that the discontinuity comes out from the surface of the lifting surface forming a protuberance.

14. The lifting surface according to claim 8, wherein the bar pulls the movable discontinuity such that it comes in from the surface of the lifting surface forming a recess.

15. An aircraft comprising a lifting surface according to claim 8.

* * * * *